US008644241B1

(12) United States Patent
Winter et al.

(10) Patent No.: US 8,644,241 B1
(45) Date of Patent: Feb. 4, 2014

(54) DYNAMIC VOLTAGE-FREQUENCY MANAGEMENT BASED ON TRANSMIT BUFFER STATUS

(75) Inventors: Itai Winter, Zeitan (IL); Penny Efraim-Sagi, Kfar Sava (IL)

(73) Assignee: Marvell International Ltd., Hamilton (BM)

( * ) Notice: Subject to any disclaimer, the term of this patent is extended or adjusted under 35 U.S.C. 154(b) by 67 days.

(21) Appl. No.: 13/396,611

(22) Filed: Feb. 15, 2012

Related U.S. Application Data

(60) Provisional application No. 61/445,438, filed on Feb. 22, 2011, provisional application No. 61/466,710, filed on Mar. 23, 2011.

(51) Int. Cl.
 *H04W 4/00* (2009.01)
(52) U.S. Cl.
 USPC ............................. 370/329; 455/522
(58) Field of Classification Search
 USPC .................. 370/318, 328, 329, 331; 455/450, 455/452.1, 452.2, 464, 509, 522
 See application file for complete search history.

(56) References Cited

U.S. PATENT DOCUMENTS

| 8,036,674 | B2 * | 10/2011 | Yim et al. ..................... | 455/450 |
| 2007/0113113 | A1 | 5/2007 | Sauer et al. | |
| 2007/0288769 | A1 * | 12/2007 | Chang et al. .................. | 713/300 |
| 2009/0023436 | A1 * | 1/2009 | Wu ............................... | 455/419 |
| 2009/0201856 | A1 * | 8/2009 | Hayashi et al. ............... | 370/328 |
| 2010/0240380 | A1 * | 9/2010 | Yim et al. ..................... | 455/450 |
| 2011/0026625 | A1 * | 2/2011 | Susitaival et al. ............. | 375/260 |
| 2011/0116470 | A1 * | 5/2011 | Arora et al. ................... | 370/331 |

OTHER PUBLICATIONS

3GPP TS 36.321, "3rd Generation Partnership Project; Technical Specification Group Radio Access Network; Evolved Universal Terrestrial Radio Access (E-UTRA); Medium Access Control (MAC) protocol specification (Release 8)", version 8.9.0, Jun. 2010.
3GPP TS 36.322, "3rd Generation Partnership Project; Technical Specification Group Radio Access Network; Evolved Universal Terrestrial Radio Access (E-UTRA); Radio Link Control (RLC) protocol specification (Release 8)", version 8.8.0, Jun. 2010.
3GPP TS 36.323, "3rd Generation Partnership Project; Technical Specification Group Radio Access Network; Evolved Universal Terrestrial Radio Access (E-UTRA); Packet Data Convergence Protocol (PDCP) specification (Release 8)", version 8.6.0, Jun. 2009.
3GPP TS 25.331, "3rd Generation Partnership Project; Technical Specification Group Radio Access Network; Radio Resource Control (RRC); Protocol Specification (Release 5)", version 5.24.0, Jun. 2009.

(Continued)

*Primary Examiner* — Hassan Phillips
*Assistant Examiner* — Ajay Cattungal

(57) ABSTRACT

A method in a mobile communication terminal includes intercepting a message in which the terminal indicates to a base station a fill level of a buffer holding data that is pending for transmission to the base station. A future processing power, which will be required by processing circuitry in the terminal for transmitting the data to the base station, is predicted based on the intercepted message. An operating point of the processing circuitry is set corresponding to the predicted future processing power, by configuring at least one parameter selected from among a supply voltage and a clock frequency of the processing circuitry. The processing circuitry is operated at the set operating point to process the data pending in the buffer.

20 Claims, 2 Drawing Sheets

(56) References Cited

OTHER PUBLICATIONS

3GPP TS 25.321, "3rd Generation Partnership Project; Technical Specification Group Radio Access Network; Medium Access Control (MAC) protocol specification (Release 5)", version 5.14.0, Sep. 2008.

3GPP TS 25.321, "3rd Generation Partnership Project; Technical Specification Group Radio Access Network; Medium Access Control (MAC) protocol specification (Release 10)", version 10.1.0, Dec. 2010.

3GPP TS 44.060, "3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 10)", version 10.3.0, Dec. 2010.

* cited by examiner

DYNAMIC VOLTAGE-FREQUENCY MANAGEMENT BASED ON TRANSMIT BUFFER STATUS

CROSS-REFERENCE TO RELATED APPLICATIONS

This application claims the benefit of U.S. Provisional Patent Application 61/445,438, filed Feb. 22, 2011, and U.S. Provisional Patent Application 61/466,710, filed Mar. 23, 2011, whose disclosures are incorporated herein by reference in their entirety.

FIELD OF THE DISCLOSURE

The present invention relates generally to reduction of power consumption in communication systems, and particularly to methods and systems for voltage and clock frequency management in communication equipment.

BACKGROUND

Power consumption is a key constraint in many battery powered communication devices. In some conventional devices, system voltage and clock frequency are set irrespective of actual power requirements which may fluctuate during operation. In fact, in some devices, an actual power requirement may even fluctuate during transmission such that a uniform or slow changing voltage and clock frequency in response to changes in actual system requirements may result in excessive power consumption.

In some communication systems, mobile communication terminals report the amount of data that is pending for transmission. Conventionally, base stations use these reports to allocate sufficient uplink resources to the terminals for transmitting the pending data. For example, the Evolved Universal Terrestrial Radio Access (E-UTRA) specifications, also referred to as Long Term Evolution (LTE), define a Medium Access Control Buffer Status Report (MAC BSR) message, in which a terminal periodically reports to a base station the fill level of its transmit buffer.

MAC BSR is addressed, for example, in "$3^{rd}$ Generation Partnership Project; Technical Specification Group Radio Access Network; Evolved Universal Terrestrial Radio Access (E-UTRA); Medium Access Control (MAC) protocol specification (Release 8)," TS 36.321, version 8.9.0, June, 2010, which is incorporated herein by reference. Sections 5.4.5 and 6.1.3.1 of this specification, for example, define the buffer status reporting mechanism.

Radio Link Control (RLC) data that is available for transmission, for the purposes of MAC BSR, is described in "$3^{rd}$ Generation Partnership Project; Technical Specification Group Radio Access Network; Evolved Universal Terrestrial Radio Access (E-UTRA); Radio Link Control (RLC) protocol specification (Release 8)," TS 36.322, version 8.8.0, June, 2010, which is incorporated herein by reference, for example in section 4.5.

Packet Data Conversion Protocol (PDCP) data that is available for transmission, for the purposes of MAC BSR, is described in "$3^{rd}$ Generation Partnership Project; Technical Specification Group Radio Access Network; Evolved Universal Terrestrial Radio Access (E-UTRA); Packet Data Convergence Protocol (PDCP) specification (Release 8)," TS 36.323, version 8.6.0, June, 2009, which is incorporated herein by reference, for example in section 4.5.

The description above is presented as a general overview of related art in this field and should not be construed as an admission that any of the information it contains constitutes prior art against the present patent application.

SUMMARY

A method in a mobile communication terminal includes intercepting a message in which the terminal indicates to a base station a fill level of a buffer holding data that is pending for transmission to the base station. A future processing power, which will be required by processing circuitry in the terminal for transmitting the data to the base station, is predicted based on the intercepted message. An operating point of the processing circuitry is set corresponding to the predicted future processing power, by configuring at least one parameter selected from among a supply voltage and a clock frequency of the processing circuitry. The processing circuitry is operated at the set operating point to process the data pending in the buffer.

In some embodiments, predicting the future processing power includes anticipating a future uplink resource allocation that will be assigned to the terminal by the base station. In an embodiment, intercepting the message includes intercepting a Medium Access Control (MAC) Buffer Status Report (BSR) message. In a disclosed embodiment, setting the operating point includes selecting the supply voltage and the clock frequency from a set of predefined multiple voltage-frequency combinations.

In an embodiment, the method includes transmitting the pending data to the base station in a discontinuous transmission mode that defines a pattern of intermittent transmission intervals, and setting the operating point includes applying the operating point during the transmission intervals. In another embodiment, setting the operating point includes configuring the clock frequency of a root system clock having a highest clock frequency among all clock signals in the processing circuitry.

In yet another embodiment, intercepting the message includes intercepting a Traffic Volume event generated by the terminal in accordance with a Universal Mobile Telecommunications System (UMTS) specification. In still another embodiment, intercepting the message includes intercepting a Total E-DCH Buffer Status (TEBS) field in scheduling information that is generated by the terminal in accordance with a Universal Mobile Telecommunications System (UMTS) specification. In another embodiment, intercepting the message includes intercepting a Countdown Value (CV) generated by the terminal in accordance with a General Packet Radio Service (GPRS) or Enhanced GPRS (EGPRS) specification.

There is additionally provided, in accordance with an embodiment that is described herein, a transmitter in a mobile communication terminal. The transmitter includes a transmitter front end and processing circuitry. The transmitter front end is configured to transmit signals to a base station. The processing circuitry is configured to intercept a message in which the terminal indicates to the base station a fill level of a buffer holding data that is pending for transmission in the signals to the base station; to predict, based on the intercepted message, a future processing power that will be required by the processing circuitry for processing the data to be transmitted to the base station; to set an operating point of the processing circuitry corresponding to the predicted future processing power, by configuring at least one parameter selected from among a supply voltage and a clock frequency of the processing circuitry; and to operate at the set operating point to process the data pending in the buffer.

In some embodiments, a mobile communication terminal includes the disclosed transmitter. In some embodiments, a chipset for processing signals in a mobile communication terminal includes the disclosed transmitter.

The present disclosure will be more fully understood from the following detailed description of the embodiments thereof, taken together with the drawings in which:

DETAILED DESCRIPTION OF EMBODIMENTS

Embodiments that are described hereinbelow provide improved methods and systems for reducing power consumption in mobile communication terminals, by adaptively controlling the clock frequency and/or supply voltage of processing circuitry in the terminal based on predicted power requirements for subsequent transmissions.

In the disclosed embodiments, the processing circuitry comprises a transmit buffer, which holds data that is pending for transmission to a base station. The terminal periodically transmits messages to the base station that indicate the fill level of the transmit buffer, typically in order to enable the base station to allocate sufficient uplink resources to the terminal for transmitting the data. In LTE systems, for example, each UE transmits Medium Access Control Buffer Status Report (MAC BSR) messages to the eNodeB for this purpose. Similar buffer status reporting messages are transmitted from a terminal to a base station in compliance with other cellular communication standards. Several examples of such standards and messages are described herein.

In some embodiments, the processing circuitry in the terminal intercepts the buffer status reporting messages, and uses them to predict the future processing power that will be required for transmitting the data to the base station. In a typical implementation, the messages are generated by one module in the terminal, e.g., by an LTE protocol stack, and intercepted by a different module.

The buffer status reports provide a good prediction of the future processing power requirement at the terminal, since the base station uses the reports in allocating future uplink resources to the terminal, and the terminal will then apply its processing power according to the amount of uplink resources available. An operating point of the processing circuitry—e.g., the clock frequency and/or supply voltage—is thus set based on the predicted future processing power.

The disclosed techniques reduce the power consumption of the mobile communication terminal, in an embodiment, since they enable the terminal to operate at most times at a low supply voltage and/or clock frequency, while at the same time meeting the terminal's processing power needs. The disclosed techniques, in an embodiment, are implemented without having to modify or redesign the protocol stack of the terminal, since they use existing protocol stack messages as input.

Figure 1:
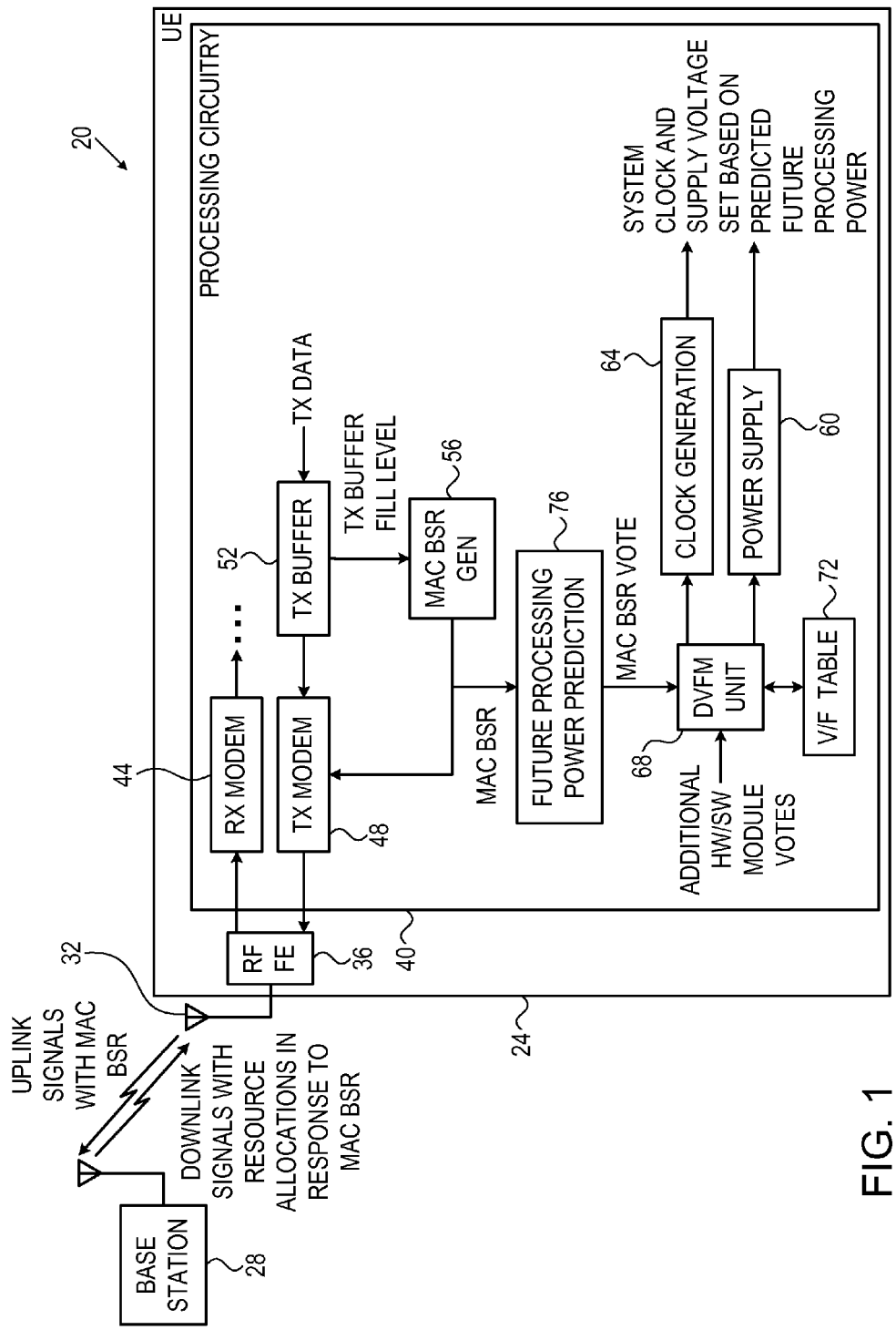
FIG. 1 is a block diagram that schematically illustrates a wireless communication system, in accordance with an embodiment that is described herein.

FIG. 1 is a block diagram that schematically illustrates a wireless communication system 20, in accordance with an embodiment that is described herein. In the present example, system 20 comprises a cellular system that operates in accordance with the LTE specifications, three of which are cited above. In alternative embodiments, system 20 operates in accordance with any other suitable communication standard or protocol, such as, for example, Universal Mobile Telecommunications System (UMTS), Global System for Mobile Communications (GSM), General Packet Radio Service (GPRS) or Enhanced GPRS (EGPRS). Certain aspects of applying the disclosed techniques in various communication protocols are addressed further below.

In the example of FIG. 1, system 20 comprises a mobile communication terminal 24 (referred to in LTE terminology, for example, as User Equipment—UE) that communicates with a base station 28 (referred to in LTE terminology, for example, as eNodeB). In real-life configurations, system 20 typically comprises a large number of base stations and a large number of terminals. Terminal 24 may comprise, for example, a cellular phone, a wireless-enabled computing device or any other suitable type of communication terminal.

In the present example, terminal 24 comprises an antenna 32, a Radio Frequency (RF) Front End (RF FE) 36 and processing circuitry 40. Antenna 32 is used for transmitting RF uplink signals to base station 28 and for receiving RF downlink signals from the base station. An RF Front End (RF FE) 36 receives the RF downlink signals from antenna 32, down-converts them to baseband, digitizes the baseband signals and provides the digital signals to processing circuitry 40. RF FE 36 also accepts digital signals for uplink transmission from processing circuitry 40, converts the digital signals to analog signals, up-converts the analog signals to RF and transmits the RF signals via antenna 32 to base station 28.

Processing circuitry 40 in this embodiment comprises a receive (RX) modem 44 that decodes the data conveyed by the received downlink signals, and a transmit (TX) modem 48 that produces the digital signals for uplink transmission. (In some embodiments, the receive modem and the transmit modem are implemented in a single modem unit.) The processing circuitry, in the embodiment, comprises a transmit (TX) buffer 52, which buffers data for transmission that is pending for processing by TX modem 48.

In accordance with LTE specifications, terminal 24 periodically transmits

Medium Access Control Buffer Status Report (MAC BSR) messages to base station 28. The MAC BSR messages indicate to the base station the fill level of TX buffer 52. The messages are used by the base station, for example, for allocating sufficient uplink resources to terminal 24 for transmitting the pending data. In the embodiment of FIG. 1, processing circuitry 40 comprises a MAC BSR generation unit 56, which assesses the fill level of TX buffer 52 (corresponding to pending data awaiting transmission) and generates the MAC BSR messages accordingly. Unit 56 provides the MAC BSR messages to TX modem 48 for transmission.

In some embodiments, processing circuitry 40 uses the MAC BSR messages to predict the future processing power that will be required from the processing circuitry. Since base station 28 typically allocates uplink resources to terminal 24 based on the MAC BSR messages that the terminal transmits, these messages are a good indication of the future processing power that will be required by the processing circuitry. The operating point of the processing circuitry (e.g., clock frequency and/or supply voltage) is then selected and set so as to meet the predicted future processing power.

If, for example, the MAC BSR messages indicate that TX buffer 52 is full or nearly full, base station 28 is likely to allocate considerable uplink resources (e.g., time or bandwidth allocations) to terminal 24 in the near future for transmitting the data. In this scenario, processing circuitry 40 is likely to require considerable processing power to process the data pending in the TX buffer. Accordingly, the operating point of the processing circuitry is set to a high supply voltage and/or high clock rate.

If, on the other hand, the MAC BSR messages indicate that TX buffer 52 is empty or nearly empty, the base station is likely to allocate little or no uplink resources to terminal 24 in the near future. In this case, processing circuitry 40 is likely to require considerably less processing power to process the pending data. Accordingly, the operating point of the processing circuitry is set to a low supply voltage and/or low clock rate.

This sort of operating point adaptation enables the processing circuitry to operate at low clock frequency and/or supply voltage (and thus reduce power consumption) when little or no data is pending, and to increase the clock frequency and/or supply voltage in order to process large volumes of data when necessary. In other words, by setting the operating point based on a TX buffer status, as reported in the MAC BSR messages, power requirements of processing circuitry 40 can be met based on actual predicted needs, with minimal overhead.

In the embodiment of FIG. 1, terminal 24 comprises a power supply 60 that produces one or more supply voltages for processing circuitry 40, and a clock generation unit 64 that generates one or more clock signals for processing circuitry 40. (Power supply 60 and clock generation unit 64 are shown in FIG. 1 as part of processing circuitry 40. In alternative embodiments, however, one or both of these elements may be external to the processing circuitry.)

Processing circuitry 40 comprises a Dynamic Voltage-Frequency Management (DVFM) unit 68, which selects and sets the operating point, e.g. voltage and clock frequency, of operating circuitry 40. In the present example, DVFM unit 68 sets the operating point by setting one or more of the voltages produced by power supply 60, and/or the clock frequency of one or more of the clock signals produced by clock generation unit 64. In various embodiments, the DVFM unit may adaptively set only clock frequency while supply voltages remain fixed, adaptively set only supply voltage while clock frequencies remain fixed, or adaptively set both clock frequency and supply voltage.

In some embodiments, DVFM unit 68 sets the operating point of the processing circuitry based on inputs (referred to as "votes") from multiple hardware and/or software modules in terminal 24. The vote of a given module typically indicates the processing power requirements of that module, and the DVFM unit typically sets the operating point so as to meet the requirements of the various modules.

In the embodiment of FIG. 1, processing circuitry 40 comprises a future processing power prediction module 76, which produces a vote that depends on the MAC BSR messages produced by MAC BSR generation unit 56. The vote typically comprises a numerical value, which is indicative of the predicted future processing power that will be required by the processing circuitry for transmitting the data pending in TX buffer 52. DVFM unit 56 selects the operating point of the processing circuitry based on the MAC BSR vote, possibly in combination with other votes from other hardware or software modules (either in processing circuitry 40 or external to the processing circuitry).

In some embodiments, processing circuitry 40 comprises a Voltage/Frequency (V/F) table 72, which holds multiple possible operating points (e.g., multiple settings of clock frequency and/or supply voltage). DVFM unit 68 selects the operating point, based on the votes, from among the possible operating points in table 76. In alternative embodiments, however, DVFM unit may select the operating point using any other suitable mechanism, for example by evaluating a predefined function defined over the votes.

The terminal configuration shown in FIG. 1 is an example configuration, which is depicted in a highly simplified manner solely for the sake of clarity. In alternative embodiments, any other suitable terminal configuration can be used. Terminal elements that are not helpful for understanding of the disclosed techniques have been omitted from the figure for the sake of clarity.

In various embodiments, some or all of the elements of terminal 24, including RF FE 36 and processing circuitry 40, are implemented in hardware, such as implementing the RF FE using one or more Radio Frequency Integrated Circuits (RFICs), or implementing the processing circuitry using one or more Field-Programmable Gate Arrays (FPGAs) or Application-Specific Integrated Circuits (ASICs). In alternative embodiments, certain elements of terminal 24 are implemented in software, or using a combination of hardware and software elements.

In some embodiments, certain terminal elements, such as certain elements of processing circuitry 40, are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

Figure 2:
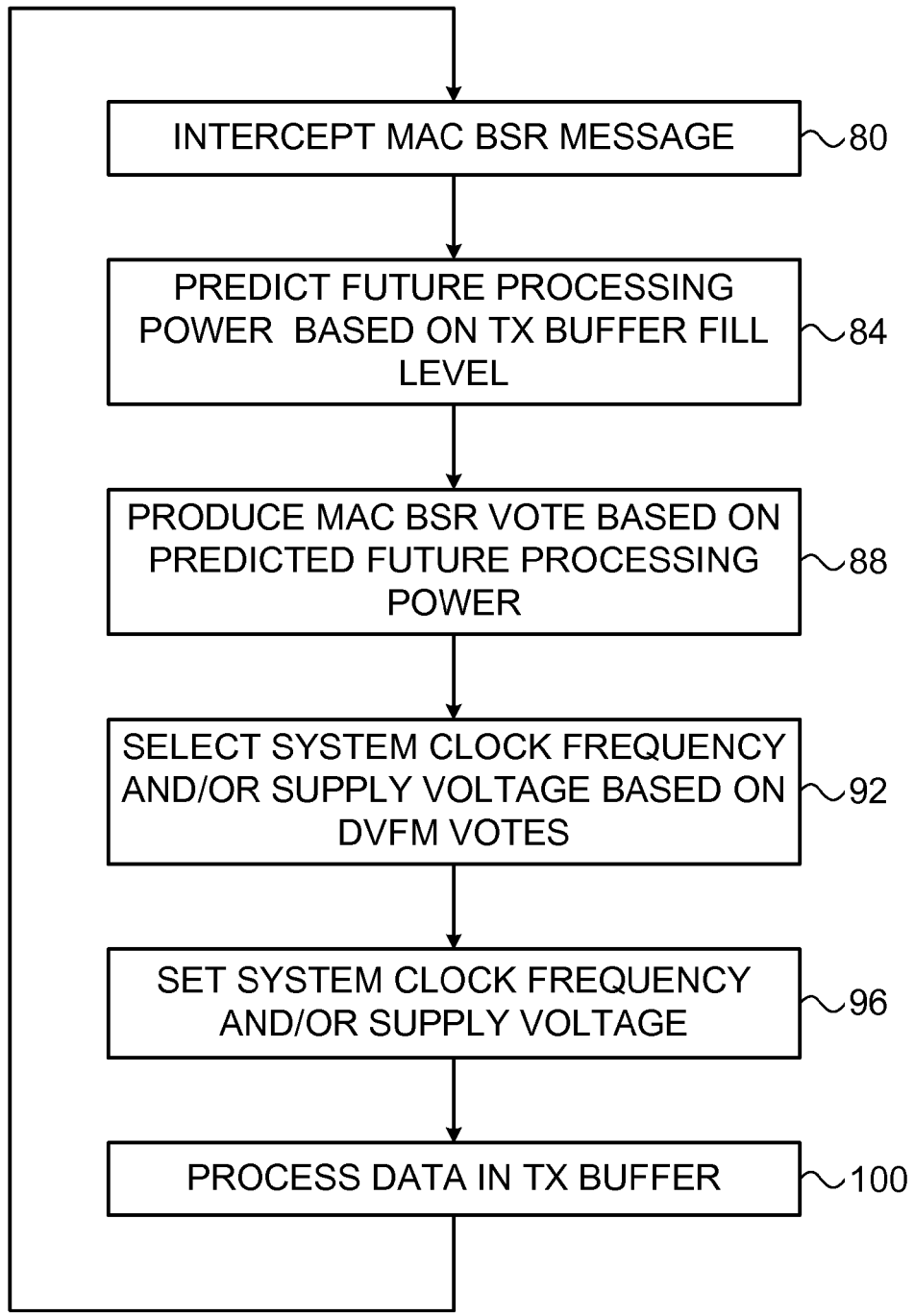
FIG. 2 is a flow chart that schematically illustrates a method for controlling the system clock frequency and/or supply voltage of a mobile communication terminal, in accordance with an embodiment that is described herein.

FIG. 2 is a flow chart that schematically illustrates a method for controlling the system clock frequency and/or supply voltage of a mobile communication terminal, in accordance with an embodiment that is described herein. The method begins, in an embodiment, with future processing power prediction module 76 intercepting a MAC BSR message that is produced by MAC BSR generation unit 56, at an interception operation 80. (Although the method description is provided in the context of LTE and MAC BSR messages, the disclosed techniques can be used in a similar manner with any suitable communication protocol and any suitable message from a transmitter to a receiver that is indicative of the fill level of a TX buffer in the transmitter. Several examples of such protocols are given further below.)

Unit 76 predicts the future processing power requirement of processing circuitry 40 based on the fill level of TX buffer 52, as reported in the intercepted MAC BSR message, at a prediction operation 84. Unit 76 produces a MAC BSR vote based on the predicted future processing power requirement, at a voting operation 88. Unit 76 provides the MAC BSR vote to DVFM unit 68.

DVFM unit 68 selects the clock frequency and/or supply voltage for processing circuitry 40 based on the MAC BSR vote, possibly in combination with other votes from other modules, at an operating point selection operation 92. The DVFM unit sets the selected clock frequency and/or supply voltage, e.g., by controlling clock generation unit 64 and/or power supply 60, at an operating point setting operation 96. Processing circuitry 40 processes the data that is pending in TX buffer 52 while operating at the set clock frequency and/or supply voltage, at a processing operation 100.

In some embodiments, the clock signal that is adapted by DVFM unit 68 is the root system clock of processing circuitry 40. In the present context, the term "system clock" is used to describe the root clock from which any other clock signal in processing circuitry 40 is derived, e.g., by frequency division. Typically, the system clock is the clock signal having the highest frequency in processing circuitry 40.

In some embodiments, terminal 24 operates in a discontinuous reception (DRX) mode that defines for the terminal a pattern of intermittent transmission intervals in which the terminal is active. Between these intervals the terminal is inactive in order to reduce power consumption. In these embodiments, processing circuitry 40 applies the adapted operating point (clock frequency and/or supply voltage) during the intermittent transmission intervals. Thus, the reduction in power consumption achieved by the disclosed techniques is in addition to the reduction in power consumption achieved by the DRX operation. When terminal 24 operates in DRX mode, the processing power needs of processing circuitry 40 typically fluctuate over time. The disclosed techniques enable prediction of these fluctuations and matching of the voltage and/or clock frequency operating point accordingly.

The embodiments described above refer to an LTE system. In alternative embodiments, the disclosed techniques can be used in any other type of communication systems in which a communication terminal transmits messages that report the fill level of the terminal's transmit buffer. An example system of this sort is UMTS release 99 until release 5, which is described, for example, in "3$^{rd}$ Generation Partnership Project; Technical Specification Group Radio Access Network; Radio Resource Control (RRC); Protocol Specification (Release 5)," TS 25.331, version 5.24.0, June, 2009; and in "3$^{rd}$ Generation Partnership Project; Technical Specification Group Radio Access Network; Medium Access Control (MAC) protocol specification (Release 5)," TS 25.321, version 5.14.0, September, 2008, which are incorporated herein by reference.

In UMTS release 99 until release 5, the amount of data in the RLC layer is referred to as Buffer Occupancy (BO). The BO is defined for each logical channel as the number of bytes that are available for transmission and retransmission in the RLC layer. The network sets a traffic volume threshold in the terminal. When the amount of data in the RLC layer exceeds this threshold, the terminal transmits a "Traffic Volume" event (denoted 4A or 4B) is to the base station. In an embodiment used in a UMTS release 99 until release 5 system, processing circuitry 40 intercepts the "Traffic Volume" event and uses this message to select and set the clock frequency and/or supply voltage.

Another example is a UMTS system of release 6 and above, as described, for example, in "3$^{rd}$ Generation Partnership Project; Technical Specification Group Radio Access Network; Medium Access Control (MAC) protocol specification (Release 10)," TS 25.321, version 10.1.0, December, 2010, which is incorporated herein by reference.

In this system, the terminal adds scheduling information to the end of a MAC-e Protocol Data Unit (PDU). The scheduling information contains a Total E-DCH Buffer Status (TEBS) field, which identifies the total amount of data available across all logical channels for which reporting has been requested by the RRC layer, and indicates the number of bytes that are available for transmission and retransmission in the RLC layer. When the MAC is connected to an AM RLC entity, control PDUs to be transmitted and RLC PDUs outside the RLC TX window are also included in the TEBS. RLC PDUs that have been transmitted but not negatively acknowledged by the peer entity are not included in the TEBS.

In an embodiment used in a UMTS release 6 and above, processing circuitry 40 intercepts the TEBS field of the scheduling information, and uses this message to select and set the clock frequency and/or supply voltage.

Yet another example is a GPRS or EGPRS system, as described, for example, in "3$^{rd}$ Generation Partnership Project; Technical Specification Group GSM/EDGE Radio Access Network; General Packet Radio Service (GPRS); Mobile Station (MS)-Base Station System (BSS) interface; Radio Link Control/Medium Access Control (RLC/MAC) protocol (Release 10)," TS 44.060, version 10.3.0, December, 2010, which is incorporated herein by reference.

The TS 44.060 specification defines a countdown procedure in which the terminal (Mobile Station—MS) sends a Countdown Value (CV) in each uplink RLC data block to indicate the current number of remaining RLC data blocks for the uplink Temporary Block Flow (TBF). The CV is based, among other parameters, on the total number of RLC data blocks currently pending for transmission in the TBF. In an embodiment used in a GPRS or EGPRS system, processing circuitry 40 intercepts the CV, and uses this message to select and set the clock frequency and/or supply voltage.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a mobile communication terminal, sending, using a protocol stack, a message in which the terminal indicates to a base station a fill level of a buffer holding data that is pending for transmission to the base station;
   intercepting the message by a prediction module in the terminal that is separate and different from the protocol stack, and predicting, based on the intercepted message, a future processing power that will be required by processing circuitry in the terminal for transmitting the data to the base station;
   setting an operating point of the processing circuitry corresponding to the predicted future processing power, by configuring at least one parameter selected from among a supply voltage and a clock frequency of the processing circuitry; and
   operating the processing circuitry at the set operating point to process the data pending in the buffer.

2. The method according to claim 1, wherein predicting the future processing power comprises anticipating a future uplink resource allocation that will be assigned to the terminal by the base station.

3. The method according to claim 1, wherein intercepting the message comprises intercepting a Medium Access Control (MAC) Buffer Status Report (BSR) message.

4. The method according to claim 1, wherein setting the operating point comprises selecting the supply voltage and the clock frequency from a set of predefined multiple voltage-frequency combinations.

5. The method according to claim 1, and comprising transmitting the pending data to the base station in a discontinuous transmission mode that defines a pattern of intermittent transmission intervals, wherein setting the operating point comprises applying the operating point during the transmission intervals.

6. The method according to claim 1, wherein setting the operating point comprises configuring the clock frequency of a root system clock having a highest clock frequency among all clock signals in the processing circuitry.

7. The method according to claim 1, wherein intercepting the message comprises intercepting a Traffic Volume event generated by the terminal in accordance with a Universal Mobile Telecommunications System (UMTS) specification.

8. The method according to claim 1, wherein intercepting the message comprises intercepting a Total E-DCH Buffer Status (TEBS) field in scheduling information that is generated by the terminal in accordance with a Universal Mobile Telecommunications System (UMTS) specification.

9. The method according to claim 1, wherein intercepting the message comprises intercepting a Countdown Value (CV) generated by the terminal in accordance with a General Packet Radio Service (GPRS) or Enhanced GPRS (EGPRS) specification.

10. A transmitter in a mobile communication terminal, the transmitter comprising:
a transmitter front end, which is configured to transmit signals to a base station; and
processing circuitry, which is configured to:
send, using a protocol stack, a message in which the terminal indicates to the base station a fill level of a buffer holding data that is pending for transmission in the signals to the base station;
intercept the message by a prediction module that is separate and different from the protocol stack, and predict, based on the intercepted message, a future processing power that will be required by the processing circuitry for processing the data to be transmitted to the base station;
set an operating point of the processing circuitry corresponding to the predicted future processing power, by configuring at least one parameter selected from among a supply voltage and a clock frequency of the processing circuitry; and
operate at the set operating point to process the data pending in the buffer.

11. The transmitter according to claim 10, wherein, by predicting the future processing power, the processing circuitry is configured to anticipate a future uplink resource allocation that will be assigned to the terminal by the base station.

12. The transmitter according to claim 10, wherein the processing circuitry is configured to intercept a Medium Access Control (MAC) Buffer Status Report (BSR) message.

13. The transmitter according to claim 10, wherein the processing circuitry is configured to select the supply voltage and the clock frequency from a set of multiple predefined voltage-frequency combinations.

14. The transmitter according to claim 10, wherein the processing circuitry is configured to transmit the pending data to the base station in a discontinuous transmission mode that defines a pattern of intermittent transmission intervals, and to apply the operating point during the transmission intervals.

15. The transmitter according to claim 10, wherein the processing circuitry is configured to set the operating point by configuring the clock frequency of a root system clock having a highest clock frequency among all clock signals in the processing circuitry.

16. The transmitter according to claim 10, wherein the processing circuitry is configured to intercept a Traffic Volume event generated by the terminal in accordance with a Universal Mobile Telecommunications System (UMTS) specification.

17. The transmitter according to claim 10, wherein the processing circuitry is configured to intercept a Total E-DCH Buffer Status (TEBS) field in scheduling information that is generated by the terminal in accordance with a Universal Mobile Telecommunications System (UMTS) specification.

18. The transmitter according to claim 10, wherein the processing circuitry is configured to intercept a Countdown Value (CV) generated by the terminal in accordance with a General Packet Radio Service (GPRS) or Enhanced GPRS (EGPRS) specification.

19. A mobile communication terminal comprising the transmitter of claim 10.

20. A chipset for processing signals in a mobile communication terminal, comprising the transmitter of claim 10.

* * * * *